United States Patent
Krause et al.

(10) Patent No.: US 11,116,132 B2
(45) Date of Patent: Sep. 14, 2021

(54) SELF-PROPELLED HARVESTING MACHINE WITH SENSORS FOR SENSING CROP DENSITY

(71) Applicant: CLAAS Selbstfahrende Erntemaschinen GmbH, Harsewinkel (DE)

(72) Inventors: Thilo Krause, Glinde (DE); Jannik Redenius, Pr. Oldendorf (DE)

(73) Assignee: CLAAS SELBSTFAHRENDE ERNTEMASCHINEN GMBH, Harsewinkel (DE)

( * ) Notice: Subject to any disclaimer, the term of this patent is extended or adjusted under 35 U.S.C. 154(b) by 373 days.

(21) Appl. No.: 16/282,900

(22) Filed: Feb. 22, 2019

(65) Prior Publication Data

US 2019/0261569 A1 Aug. 29, 2019

(30) Foreign Application Priority Data

Feb. 23, 2018 (DE) ..................... 10 2018 104 207.8

(51) Int. Cl.
*A01D 41/127* (2006.01)
*A01D 65/06* (2006.01)
(Continued)

(52) U.S. Cl.
CPC ........... *A01D 41/127* (2013.01); *A01D 65/06* (2013.01); *A01D 75/28* (2013.01); *G01S 7/4802* (2013.01);
(Continued)

(58) Field of Classification Search
CPC .. A01D 75/28; A01D 41/127; A01D 41/1271; A01D 41/141; A01D 65/06;
(Continued)

(56) References Cited

U.S. PATENT DOCUMENTS 6,584,390 B2 * 6/2003 Beck .................... A01D 41/127
172/4.5
9,301,446 B2 * 4/2016 Peters .................. A01D 41/127
(Continued)

FOREIGN PATENT DOCUMENTS

DE  10 2008 043 716 A1  5/2010
DE     102011017621 A1  10/2012
(Continued)

OTHER PUBLICATIONS

European Search Report dated Jun. 17, 2019 Issued in EP18211549 (with English translation of relevant parts).

*Primary Examiner* — Adam J Behrens
(74) *Attorney, Agent, or Firm* — Collard & Roe, P.C.

(57) ABSTRACT

A self-propelled harvesting machine for harvesting a crop field has a ground drive including multiple working units, a control system and a sensor system. The sensor system periodically emits transmitted pulses of electromagnetic transmission beams in at least one transmission direction onto the crop field and the transmitted pulses are reflected on the crop field and are received as echo pulses by the sensor system. For at least one portion of the transmitted pulses, different partial beams of a single transmission beam are reflected by plants of the crop field lying one behind the other with a time offset, so the particular resultant echo pulse is composed of time-offset partial echo pulses. The control system determines a value for the crop density on the basis of a time correlation within the resultant echo pulse, and controls the ground drive and/or the working units on the basis of the determined crop density.

14 Claims, 3 Drawing Sheets

(51) Int. Cl.
  *A01D 75/28* (2006.01)
  *G01S 7/48* (2006.01)
  *G01S 17/88* (2006.01)
  *G01S 17/42* (2006.01)
  *A01D 91/02* (2006.01)

(52) U.S. Cl.
  CPC ............ *G01S 7/4808* (2013.01); *G01S 17/42* (2013.01); *G01S 17/88* (2013.01); *A01D 91/02* (2013.01)

(58) Field of Classification Search
  CPC ..... A01D 91/02; G01S 7/4802; G01S 7/4808; G01S 17/42; G01S 17/88; G01S 17/93
  See application file for complete search history.

(56) References Cited

U.S. PATENT DOCUMENTS

| | | | |
|---|---|---|---|
| 2013/0116883 A1* | 5/2013 | Kormann | A01B 79/005 701/32.3 |
| 2015/0264863 A1* | 9/2015 | Muench | A01D 41/1271 701/50 |
| 2016/0366821 A1* | 12/2016 | Good | G06K 9/00657 |
| 2017/0118915 A1* | 5/2017 | Middelberg | A01D 69/03 |
| 2019/0110394 A1* | 4/2019 | VanNahmen | A01D 34/006 |
| 2019/0261560 A1* | 8/2019 | Jelenkovic | A01D 75/00 |

FOREIGN PATENT DOCUMENTS

| | | |
|---|---|---|
| DE | 102011085380 A1 | 5/2013 |
| DE | 102015118767 A1 | 5/2017 |
| EP | 1 271 139 A2 | 1/2003 |
| EP | 2591654 A1 | 5/2013 |

* cited by examiner

SELF-PROPELLED HARVESTING MACHINE WITH SENSORS FOR SENSING CROP DENSITY

CROSS-REFERENCE TO RELATED APPLICATIONS

This application claims priority under 35 USC 119 of German Applcation No. 10 2018 104 207.8, filed on Feb. 23, 2018, the disclosure of which is herein incorporated by reference.

BACKGROUND OF THE INVENTION

The present invention relates to a self-propelled harvesting machine for harvesting a crop field.

Agricultural harvesting machines, which include, in particular, self-propelled harvesting machines such as combine harvesters, generally comprise various working units which can be operated with the aid of fluctuating parameters during the processing of crop. For optimal operation, it is recommended to adjust the control of the working units depending on various limiting conditions, which include, in particular, the crop density of the crop field to be harvested. The sensor-assisted determination of a reference variable, such as the crop density of the crop field to be harvested, is at the forefront in this case.

The known self-propelled harvesting machine (DE 10 2008 043 716 A1), on which the invention is based, comprises a sensor system utilized for determining the crop density of a crop field to be harvested by a harvesting machine. The sensor system periodically emits transmitted pulses of electromagnetic transmission beams in various transmission directions onto the crop field. The transmitted pulses are reflected on the crop field and are received by the sensor system as echo pulses. Due to the fact that the beam divergence of the transmission beams is low, a correspondingly low beam cross-section results in the area of the plants. The distance between the sensor system and the reflecting plant is determined on the basis of the propagation time of the transmitted pulses to the echo pulses.

Different distance values result depending on whether a transmission beam is reflected on a plant at the front or passes the plants at the front and impacts a plant within the crop and is reflected by this plant. On the basis of the statistical distribution of the determined distance values, in particular, on the basis of the standard deviation for the distance values, a value for the crop density can be determined, which is utilized for adjusting machine parameters.

The disadvantage of the known harvesting machine is the need to carry out a plurality of measurements before a value for the crop density can even be estimated with an acceptable level of accuracy. Reliable information regarding the crop density is therefore first available only at a relatively late point in time, which can be critical with respect to an adjustment of the machine parameters in real time.

This applies similarly for the self-propelled harvesting machine disclosed in EP 1 271 139 A2, in the case of which the intensity of the echo signals, i.e., the radiation power of the echo signals, is to provide an indication for the crop density of the crop field.

SUMMARY OF THE INVENTION

The problem addressed by the invention is that of designing and refining the known self-propelled harvesting machine in such a way that the crop density utilized for adjusting the machine parameters is present at an earlier point in time.

The aforementioned problem is solved in the case of a self-propelled harvesting machine for harvesting a crop field including a plurality of plants, comprising a ground drive, multiple working units, a control system and a sensor system, wherein the sensor system periodically emits transmitted pulses of electromagnetic transmission beams in at least one transmission direction onto the crop field. The transmitted pulses are reflected on the crop field and are received as echo pulses by the sensor system. For at least one portion of the transmitted pulses, different partial beams of one and the same transmission beam are reflected by plants of the crop field lying one behind the other in the particular transmission direction with a time offset with respect to one another, and so the particular resultant echo pulse is composed of correspondingly time-offset partial echo pulses. The control system determines a value for the crop density on the basis of a time correlation within the resultant echo pulse, and the control system controls the ground drive and/or the working units on the basis of the determined crop density.

According to the invention, it is assumed, first of all, that the harvesting machine comprises a ground drive and/or multiple working units which can be controlled with the aid of the control system.

Of essential importance is the fundamental finding that multiple partial echo pulses, of which the resultant echo pulse is composed, can be generated using one single transmission beam. This is based on a multiple reflection of the particular transmission beam, namely, on the one hand, on a plant in the front and, on the other hand, on at least one plant within the crop. For this purpose, the transmission beam is to be provided with a relatively great beam divergence, and so the transmission beam can split into different partial beams. The partial beams add up to form the beam cross-section of the transmission beam in this case.

The different partial beams are reflected, with a time offset with respect to one another, on plants of the crop field lying one behind the other, and so the particular resultant echo pulse is composed of correspondingly time-offset partial echo pulses.

According to the invention, it has also been recognized that this time-offset reflection, which is reflected in the shape of the curve of the resultant echo pulse over time, can provide information regarding the crop density. Correspondingly, it is initially provided, more generally, according to the invention, that a value for the crop density, which is available in an extraordinarily short time, is determined with the aid of the control system based on a time correlation within the resultant echo pulse, as is explained further below.

Finally, it is essential for the approach according to the invention that the control system controls the ground drive and/or the working units based on the determined crop density.

With the aid of the approach according to the invention, a value for the crop density can already be determined from one single measurement, i.e., with the aid of a single transmitted pulse. This is due to the fact that the multiple reflection of the transmitted pulse yields information regarding the penetration length of the transmission beam into the crop field portion, on the basis of which a value for the crop density of the crop field can be derived. Therefore, the number of measurements required for the determination of the crop density and the effort required for the further data processing, in particular, for averaging or the like, can be reduced, and so the determination of the crop density is possible in a relatively short period of time and, therefore, an optimal control of the harvesting machine in real time based on the determined crop density is possible.

It should be pointed out that the term "echo pulse" is to be broadly interpreted in this case. An echo pulse refers not only to one coherent echo pulse, but also to an echo pulse composed of multiple partial pulses.

A preferred embodiment relates to a forward-looking control of the ground drive and/or the working units based on the determined crop density, in that the control system carries out at least one portion of the control before the crop field, on which the determination of the crop density is based, enters the harvesting machine. As a result, the machine parameters can be adjusted with respect to pending changes in the crop field in a timely manner.

In the further preferred embodiment, the sensor system comprises a laser scanner which is situated on the harvesting machine. Preferably, the transmission direction can be adjusted with the aid of the control system.

A particularly advantageous utilization of the determined values for the crop density is obtained according to another embodiment, in that the determined values for the crop density can be aligned with the values determined by a throughput-measuring system. As a result, the accuracy of the throughput-measuring system can be increased in a particularly easy way.

In the particularly preferred embodiment, the time correlation, on which the determination of the value for the crop density is based, is based on a time offset between two partial echo pulses which trace back to one and the same transmitted pulse. The time offset can be, for example, the pulse width of the resultant echo pulse, which preferably represents the overall width of the resultant echo pulse in the time range.

In the further preferred embodiment, the time offset is determined, in that a normalization width, which represents the width of the echo pulse in the time range in the case of a single reflection, is subtracted from the pulse width of the resultant echo pulse. Therefore, the time offset corresponds to the particular penetration depth of the transmission beam into the crop field. The penetration depth can be calculated on the basis of the time offset, which has been determined in this way, in that the time offset is multiplied by the propagation speed of the transmission beams. The reciprocal value of the penetration depth is then proportional to the crop density.

Further preferred embodiments relate to the design of the transmission beam having a comparatively large beam cross-section, and so a multiple reflection of the transmitted pulse on different plants in the crop field is supported. According to one embodiment, the resultant measurement spot of the transmission beam is so large that partial beams passing by a plant reflecting the transmission beam can impact a downstream plant.

In an embodiment, which is also preferred, the sensor system is designed as an optical distance sensor, wherein the sensor system is configured for determining a distance on the basis of the propagation time of a transmission beam up to the reception of the particular echo pulse. Such sensor systems are also referred to as time-of-flight sensor systems.

In order to increase the statistical robustness of the determined crop density, it is provided according to an embodiment that a total value for the crop density is generated in a statistical method, in particular, via averaging, on the basis of several determined values.

The determination of the value for the crop density takes place according to a calculation rule which takes into account characteristic values for the plants of the crop field under consideration. These include, in particular, the volume of the plants, the reflectivity of the plants, and the like. It is essential, according to an embodiment, that the calculation rule is selected or modified from a number of stored calculation rules depending on the type of crop field to be harvested.

Therefore, the harvesting machine can be adjusted with respect to a new type of crop field to be harvested with the aid of a simple software measure without the need to implement any types of mechanical changes.

A crop height can be determined on the basis of the distance values and/or the values for the crop density. This is possible, for example, due to the fact that, provided there is a steady advance of the rows to be scanned, the distance values abruptly increase as soon as the crest line of the crop field has been reached. The position of a crop edge or the position of an obstacle can be determined in a similar way on the basis of the determined values.

It should also be pointed out that the term "crop density" is to be broadly interpreted in this case. The term "crop density" encompasses any piece of information which indicates what quantity of plants is present, per area, in the crop field. This can be, for example, the number of plant stalks per area, the volume of plants per area, or the like. The term "area" refers to the area of the crop field in a top view, in the vertical direction, in this case.

BRIEF DESCRIPTION OF THE DRAWINGS

The invention is explained in the following in greater detail with reference to a drawing representing only one exemplary embodiment. In the drawings.

DETAILED DESCRIPTION OF THE PREFERRED EMBODIMENTS

Figure 1:
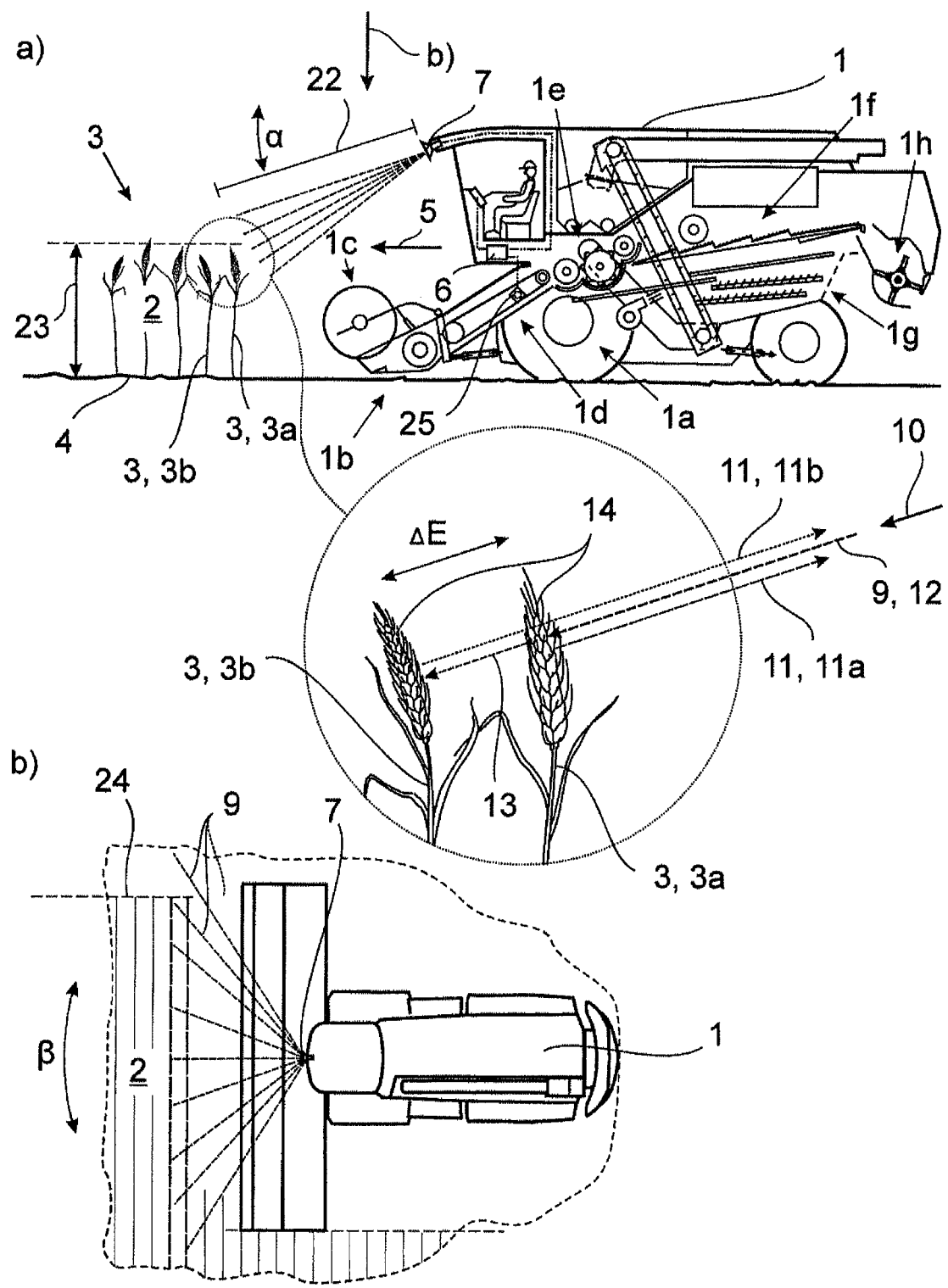
FIG. 1 shows a harvesting machine according to the invention comprising a sensor system during the harvesting of a crop field a) in a side view and b) in a top view.

The harvesting machine 1 according to the invention, which is represented in FIG. 1, is utilized for harvesting a crop field 2 which consists of a plurality of plants 3. The plants 3 of the crop field 2 are located on ground 4, as is also clear from the representation according to FIG. 1.

During the harvesting operation, the crop field 2 is located ahead of the harvesting machine 1, as viewed in the direction of travel 5 of the harvesting machine 1. As viewed from the harvesting machine 1, there are the frontmost plants 3a and the plants within the crop 3b.

The represented agricultural harvesting machine 1 is a self-propelled harvesting machine for processing picked-up crop into kernels. The represented harvesting machine 1 comprises a ground drive 1a and an intake unit 1b which is equipped with an exchangeable front harvesting attachment 1c. The front harvesting attachment 1c is adjoined by a non-exchangeable feeder 1d which feeds the crop, which has been picked up with the aid of the intake unit 1b, to a threshing unit 1e. Positioned downstream from the threshing unit 1e are a separating device 1f, a cleaning device 1g, and a spreading device 1h for spreading the material other than grain on the field.

The harvesting machine 1 comprises a control system 6 and a sensor system 7, wherein, with the aid of the sensor system 7, transmitted pulses 8 of electromagnetic transmission beams are periodically emitted in at least one transmission direction 10 onto the crop field 2. The transmitted pulses 8 are reflected on the crop field 2 and are received by the sensor system 7 as echo pulses 11.

Figure 2:
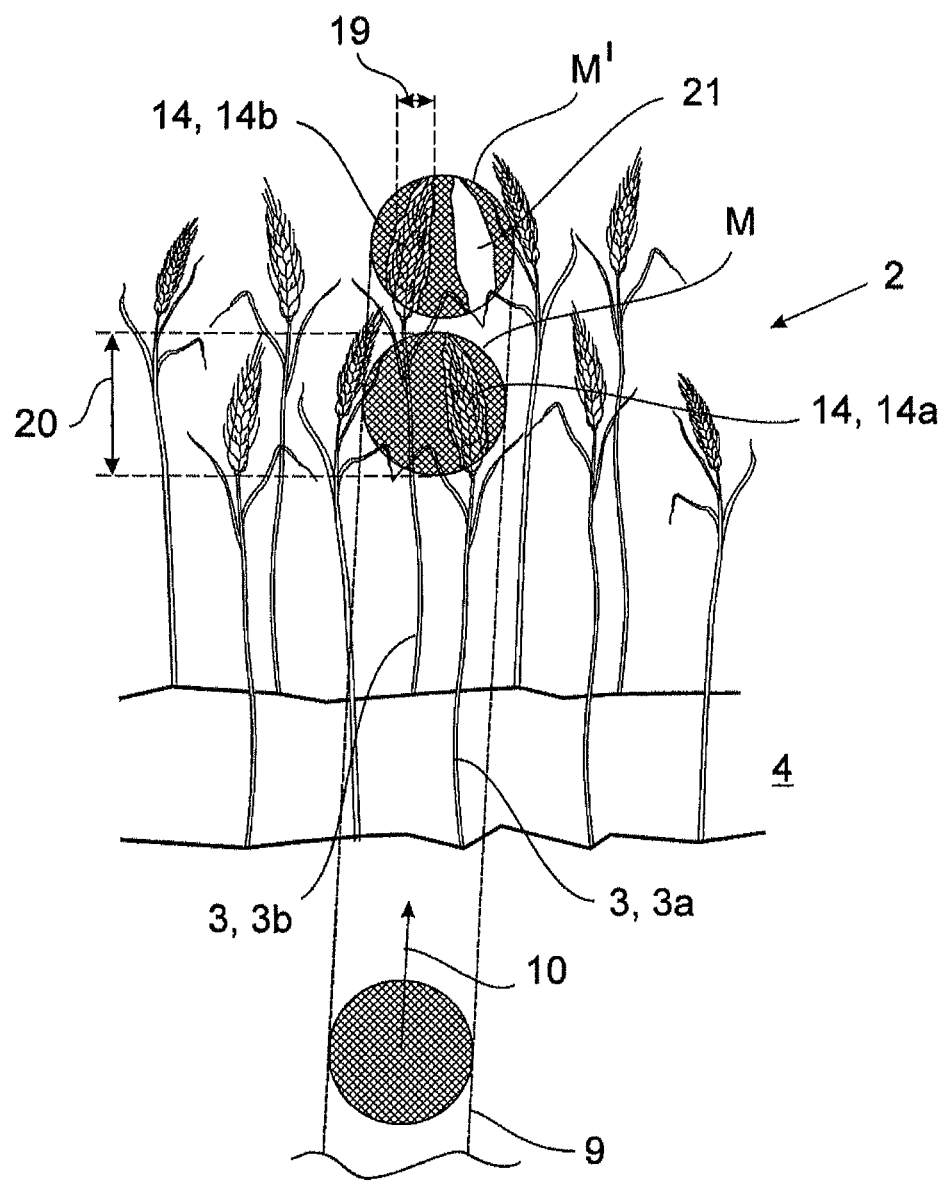
FIG. 2 shows the crop field according to FIG. 1 in a view along the direction of travel of the harvesting machine.

Viewing FIGS. 1 and 2 in combination shows that, for at least one portion of the transmitted pulses 8, different partial beams 12, 13 are reflected by plants 3a, 3b of the crop field 2 lying one behind the other in the particular transmission direction 10 with a time offset with respect to one another. The reason therefor is that the partial beam 13 in FIG. 1a) must cover an additional distance as compared to the partial beam 12, namely two times the distance ΔE. The time offset therefore results from the division of the additional distance by the propagation speed of the transmission beam 9.

FIG. 2 shows that a measurement spot on the plant 3a is associated with the transmission beam 9 and is defined by the beam cross-section of the transmission beam 9. In this case and preferably, the plants 3 of the crop field 2 include ears 14, wherein the ear 14a of the front plant 3a effectuates the reflection of the first partial beam 12, while the ear 14b of the rear plant 3b effectuates the reflection of a second partial beam 13.

It should be pointed out that the representation of the transmission beam 9 and of the partial beams 12, 13 in the drawing is an idealized state. In a real environment, a plurality of partial beams 12, 13 mostly results from one and the same transmission beam 9, to which the basic principle according to the invention can be similarly applied in each case. In this regard, all statements made with respect to the partial beams 12, 13 apply similarly to all other partial beams which may arise.

Figure 3:
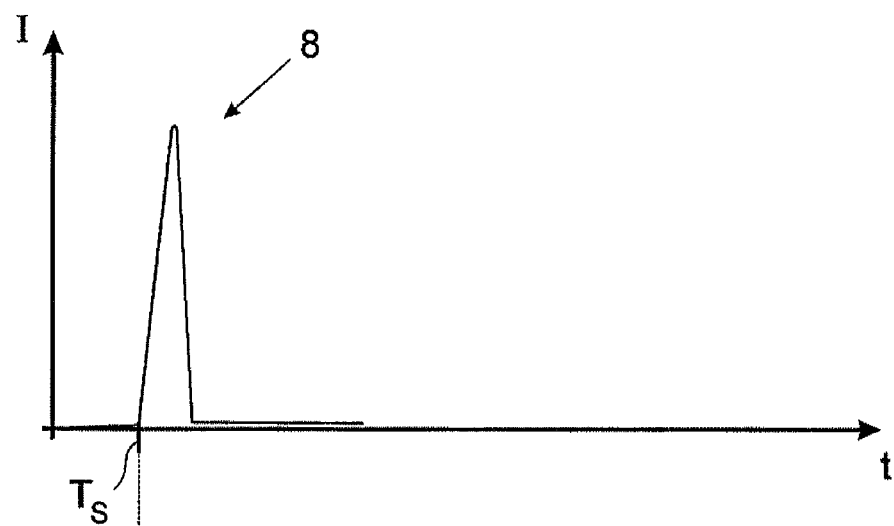
FIG. 3 shows a) a transmitted pulse of the sensor system according to FIG. 1 and b) the resultant echo pulse associated with the transmitted pulse.
Figure 3:
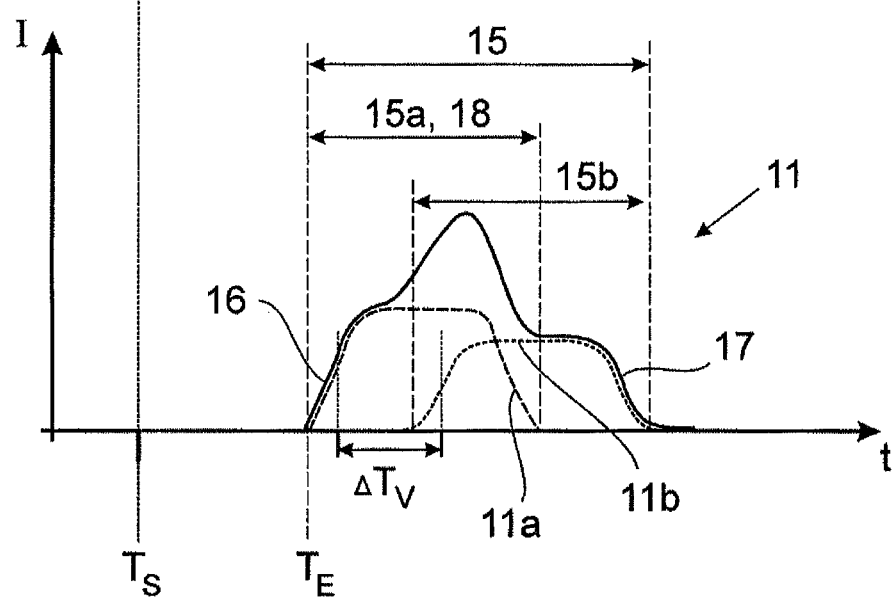

As a result of the time-offset reflection of the partial beams 12, 13, the particular resultant echo pulse 11 is composed of correspondingly time-offset partial echo pulses 11a, 11b, as is clear from the representation according to FIG. 3. FIG. 3a) shows, first of all, the transmitted pulse 8 which is emitted by the sensor system 7 in a transmission direction 11 onto the crop field 2. In FIG. 3a), the transmitted pulse is represented by its radiation power I over time t.

A corresponding representation of the resultant echo pulse 11 is provided in FIG. 3b). Therein, it is shown that the particular resultant echo pulse 11 is composed of correspondingly time-offset partial echo pulses 11a, 11b. In the exemplary embodiment which is represented and, in this regard, is preferred, this means the resultant echo pulse 11 results from an addition of the two partial echo pulses 11a, 11b. The time offset $\Delta T_V$ corresponds to the aforementioned time which the transmission beam 9 requires to cover the distance ΔE two times. On the basis of the profile shown in FIG. 3b), it is clear that the two partial echo pulses 11a, 11b transition into one another in the time range. Depending on the structure of the crop field 3, it is also possible that the partial echo pulses 11a, 11b are separated from one another in the time range.

Viewing FIGS. 1, 2 and 3 in combination shows that the distance ΔE, which is also referred to as "penetration depth" in this case, can provide information regarding the crop density. In this case, it is interesting that the penetration depth ΔE can be derived from the time offset $\Delta T_V$. Therefore, first of all, more generally, it is provided that a value for the crop density is determined based on a time correlation within the resultant echo pulse 11 with the aid of the control system 6.

The ground drive 1a and/or the working units 1b are controlled with the aid of the control system 6 based on the determined crop density. One particular advantage of this type of control of the components involved is that the control is carried out in a forward-looking manner in such a way that first measures for control can be carried out even before the crop field 2 has been drawn into the harvesting machine 1.

In addition to the utilization of the value according to the invention for the crop density of the crop field 2 for a forward-looking control of the harvesting machine 1, it is also conceivable, in principle, that the determined crop density is utilized for optimizing a sensor-assisted process monitoring within the harvesting machine 1. In this context, it is provided that the harvesting machine 1 comprises a throughput-measuring system 25, in particular, a material-feed-height measuring system for determining a throughput, and that the determined throughput is aligned with the determined crop density with the aid of the control system 6. This means, a value for the expected throughput is calculated on the basis of the determined value for the crop density with consideration for the ground speed of the harvesting machine 1, and this calculated throughput is aligned with the throughput measured with the aid of the throughput-measuring system 25. The term "aligned" means, in this case, that a deviation of the compared throughputs results in an appropriate correction of the throughput-measuring system 25 or the sensor system 7. Such a correction can be carried out, for example, with the aid of a correction factor, by which the particular determined throughput is multiplied in order to obtain the corrected throughput.

The sensor system 6 preferably comprises a laser scanner which is situated on the harvesting machine 1 and directs the transmission beams 9 onto the crop field 2 at an inclination angle α with respect to the horizontal and at a scanning angle β with respect to the direction of travel 5 about the vertical.

In one particularly preferred embodiment, the aforementioned time correlation is the aforementioned time offset $\Delta T_V$ between two partial echo pulses 11a, 11b, in this case and preferably, between the first partial echo pulse 11a and the last partial echo pulse 11b, which are associated with a transmitted pulse 9.

FIG. 3b) shows that the time offset $\Delta T_V$ can be basically derived from the resultant echo pulse 11. Preferably, the time offset $\Delta T_V$ is determined from the pulse width 15 of the resultant echo pulse 11, wherein the pulse width 15 is defined by the time lag between the first rising pulse edge 16 and the last falling pulse edge 17 of the echo pulse 11.

It is also preferably provided that the time offset $\Delta T_V$ is determined in that a normalization width 18 is subtracted from the pulse width 15, wherein the normalization width 18 is preferably defined by the pulse width 15a of the resultant echo pulse 11a, which would result in the case of an assumed single reflection of the transmission beam 9 on a plant 3a of the crop field 2. In the exemplary embodiment which is represented and, in this regard, is preferred, the normalization width 18 is therefore the pulse width 15a of the first partial echo pulse 11a. In this case, it is assumed, for the sake of simplicity, that the pulse widths 15a, 15b of the two partial echo pulses 11a, 11b are identical to one another.

As mentioned above, the value for the crop density can be determined, in principle, from the penetration depth ΔE. Preferably, it is provided that the value for the crop density is determined in that the reciprocal value of the penetration depth ΔE of the transmission beam 9 into the crop field 2 is formed and the penetration depth ΔE is determined from the product of the time offset $\Delta T_V$ with the propagation speed and, if necessary, a normalization factor. This reciprocal value is then to be multiplied by a proportionality factor in order to arrive at the particular desired value for the crop density, depending on the definition of the crop density.

FIG. 2 shows that the beam cross-section of the transmission beam 9 must have a minimum extension in order to allow for the multiple reflection of the transmission beam 9 according to the invention. In this case and preferably, the transmission beam 9 forms a round beam cross-section on the plants 3a located furthest at the front relative to the particular transmission direction. The round beam cross-section has a diameter of more than 10 mm, preferably more than 20 mm, further preferably more than 30 mm. The term "diameter" is to be understood, in an expanded sense, that in the case of an elliptical beam cross-section, the diameter corresponds to the length of the main axis of the cross-section.

In the case of plants 3 comprising elongate ears 14, the measurement spot is preferably designed in such a way that the transmission beam 9 can radiate past the relevant ear 14. Specifically, the plants 3 preferably form elongate ears 14 having a moderate width extension 19, wherein a measurement spot M is associated with the transmission beam 9 on the ears 14 of the plants 3a located furthest at the front relative to the particular transmission direction 10, due to the beam cross-section of the transmission beam 9, the diameter 20 of which is greater at least in one direction, in particular, at least two times greater, than the width extension 19 of the ears 14. This correlation is schematically indicated in FIG. 2. FIG. 2 further shows that the measurement spot M' forms, in the area of the plant 3b within the crop, an excluded area 21 which results from the reflection of the partial beam 12, i.e., by the resultant radiation.

Different advantageous variants of the embodiment of the sensor system 7 are conceivable. In this case and preferably, the electromagnetic beams are optical beams, in particular, laser beams, the transmission direction 10 of which can be adjusted with the aid of the control system 6. In one particularly preferred embodiment, the sensor system 7 is a laser scanner, as mentioned above, which scans the crop field 2 in horizontally oriented rows.

Preferably, the sensor system 7 is designed, more generally, as an optical distance sensor, wherein a distance value 22 between the sensor system 7 and the particular reflecting plant 3a is determined with the aid of the sensor system 7 on the basis of the time lag of the point in time of the transmission $T_S$ of a transmission pulse 8 at the point in time of reception $T_E$ of the associated echo pulse 11. As mentioned further above, the sensor system 7 is preferably a time-of-flight sensor system.

Up to this point, the method according to the invention relates to the determination of a value for the crop density of the crop field 2. Preferably, however, a plurality of values for the crop density is determined, in particular, the value for the crop density is determined for each transmission pulse 8 or for each transmission pulse 8 of a group of transmission pulses 8. In this case and preferably, it is provided that the determined values for the crop density are converted, in a statistical method, in particular via averaging, into a total value for the crop density.

A particularly high level of flexibility for the harvesting machine 1 in terms of the harvesting of different types of crop fields 2 is achieved in that the value for the crop density is determined according to a calculation rule and the control system 6 is configured for selecting or modifying the calculation rule forming the basis for the determination of the crop density from a number of stored calculation rules depending on the type of crop field 2 to be harvested. As mentioned further above, it is therefore possible to modify the harvesting machine 1 for different types of crop fields 2 without the need to carry out a mechanical adaptation.

It has already been pointed out that the sensor system 7 is preferably a laser scanner. In this case, the transmission direction 10 of the sensor system 7 is preferably continuously modified in the horizontal direction and/or in the vertical direction with the aid of the control system 6. An aforementioned row-by-row "scanning" of the crop field 2 is also preferred in this case.

In one particularly preferred embodiment it is provided that a crop height 23 is determined with the aid of the control system 6 on the basis of the distance values and/or the values for the crop density. In the case of the aforementioned laser scanner, a row-by-row scanning of the crop field 2 is provided, wherein the inclination angle α is selected to be increasing flatter. When the upper crest line of the crop field 2 has been reached, not only do the aforementioned distance values change, but the values for the crop density also abruptly change, on the basis of which the position of the crest line can be identified in an automated manner.

Alternatively or additionally, it can be provided that the position of a lateral crop edge 24 is determined with the aid of the control system 6 on the basis of the distance values and/or the values for the crop density. This can also be accomplished via the automated detection of an abrupt change in the relevant values.

Alternatively or additionally, it is further provided that the position of an obstacle is determined with the aid of the control system 6 on the basis of the distance values and/or the values for the crop density. This determination can also be based on the automated detection of an abrupt change of the relevant values.

Finally, it should also be pointed out that not only the crop density, but also surroundings conditions can be determined with the aid of the approach according to the invention, for example, the structure of the crop field 2, the contour of the crop field 2, the permeability of the plants 3, or the like.

LIST OF REFERENCE CHARACTERS 1 harvesting machine
1a ground drive
1b-h working units
2 plants
3 crop field
3a front plants
3b rear plants
4 ground
5 direction of travel
6 control system
7 sensor system
8 transmitted pulses
9 transmission beam
10 transmission direction
11 echo pulse
11a partial echo pulse
11b partial echo pulse
12, 13 partial beams
M measurement spot, front
M' measurement spot, rear
14 ear
14a front ear 14b rear ear
15 pulse width
15a pulse width
15b pulse width
16 pulse edge
17 last falling pulse edge
18 normalization width
19 width extension
20 diameter
21 excluded area
22 distance value
23 crop height
24 crop edge
25 throughput-measuring system

What is claimed is:

1. A self-propelled harvesting machine for harvesting a crop field including a plurality of plants, comprising:
a ground drive comprising multiple working units,
a control system,
a sensor system that is configured to periodically emit transmitted pulses of electromagnetic transmission beams in at least one transmission direction onto the crop field, wherein the transmitted pulses of electromagnetic transmission beams are reflected on the crop field and are received as echo pulses by the sensor system,
wherein for at least one portion of the transmitted pulses of electromagnetic transmission beams, the sensor system is configured such that different partial beams make up each one of the electromagnetic transmission beams and that different partial beams are reflected by plants of the crop field lying one behind the other in the particular transmission direction with a time offset with respect to one another, and so a resultant echo pulse is composed of correspondingly time-offset partial echo pulses,
wherein the control system is configured to determine a value for the crop density based on a time correlation within the resultant echo pulse, wherein each transmission beam is configured to have a beam cross-section with a minimum extension which enables the different partial beam reflection and the time-offset partial echo pulses of each transmission beam at the plants lying one behind the other, wherein the different partial beam reflection and the time-offset partial echo pulses of each transmission beam provide a measure of a penetration depth of each transmission beam into the crop, from which the value for the crop density of the crop is derived by the control system, and wherein the control system is configured to control the ground drive and/or the working units based on the determined value for the crop density.

2. The self-propelled harvesting machine as claimed in claim 1, wherein the control system is configured to control the ground drive and/or the working units in a forward-looking manner based on the determined value for the crop density, by carrying out at least one portion of the control before the crop field, on which the determination of the value for the crop density is based, enters the harvesting machine.

3. The self-propelled harvesting machine as claimed in claim 1, wherein the sensor system comprises a laser scanner which is situated on the harvesting machine and which is configured to direct the transmission beams onto the crop field at an inclination angle ($\alpha$) with respect to a horizontal plane and at a scanning angle ($\beta$) with respect to a direction of travel about a vertical axis.

4. The self-propelled harvesting machine as claimed in claim 1, wherein the harvesting machine comprises a throughput-measuring system in the form of a material-feed-height measuring system for determining a throughput, and the control system is configured to align the determined throughput with the determined value for the crop density.

5. The self-propelled harvesting machine as claimed in claim 1, wherein the control system is configured to determine the value for the crop density based on the time correlation being the time offset ($\Delta Tv$) between two of the time-offset partial echo pulses comprising a first partial echo pulse and a last partial echo pulse, which are associated with one of the transmission beams.

6. The self-propelled harvesting machine as claimed in claim 5, wherein the control system is configured to determine the time offset ($\Delta Tv$) from a pulse width of the resultant echo pulse, and the pulse width is defined by a time lag between a first rising pulse edge and a last falling pulse edge of the echo pulse.

7. The self-propelled harvesting machine as claimed in claim 6, wherein the control system is configured to determine the time offset ($\Delta Tv$) by subtracting a normalization width from the pulse width, the normalization width being defined by the pulse width of the resultant echo pulse, which would result in the case of an assumed single reflection of the transmission beam on a plant of the crop field.

8. The self-propelled harvesting machine as claimed in claim 1, wherein the control system is configured to determine the value for the crop density by forming a reciprocal value of the penetration depth ($\Delta E$) of the transmission beam into the crop field, the penetration depth ($\Delta E$) being determined from a product of the time offset ($\Delta Tv$) with a propagation speed and a normalization factor.

9. The self-propelled harvesting machine as claimed in claim 1, wherein each one of the transmission beams is configured to form a round beam cross-section on the plants located furthest at a front relative to a particular transmission direction, the transmission beams each having a diameter of more than 10 mm.

10. The self-propelled harvesting machine as claimed in claim 1, wherein each one of the transmission beams is configured such that when the plants form comprise elongate ears having a width extension, a measurement spot (M) associated with the transmission beam on the ears of the plants located furthest at a front relative to a particular transmission direction has a diameter that is greater in at least one direction than the width extension of the ears, due to a cross-section of the transmission beam.

11. The self-propelled harvesting machine as claimed in claim 1, wherein the sensor system is designed as an optical distance sensor, and a distance value between the sensor system and a particular reflecting plant is determined with the aid of the sensor system on the basis of a time lag of a point in time of the transmission (Ts) of a transmission pulse at a point in time of reception (TE) of the associated echo pulse.

12. The self-propelled harvesting machine as claimed in claim 1, wherein the control system is configured to determine the value for the crop density for each transmission pulse or for each transmission pulse of a group of transmission pulses, and convert the determined values for the crop density in a statistical method into a total value for the crop density.

13. The self-propelled harvesting machine as claimed in claim 1, wherein the control system is configured to determine the value for the crop density according to a calculation rule, and the control system is configured for selecting or modifying the calculation rule forming the basis for the determination of the crop density from a number of stored calculation rules depending on a type of crop field to be harvested.

14. The self-propelled harvesting machine as claimed in claim 1, wherein the control system is configured to determine a crop height, a position of a crop edge or a position of an obstacle, on a basis of distance values and/or the determined values for the crop density.

\* \* \* \* \*